J. A. CAROTHERS.
SAW GRINDING MACHINE.
APPLICATION FILED SEPT. 6, 1917.

1,281,512.

Patented Oct. 15, 1918.
3 SHEETS—SHEET 1.

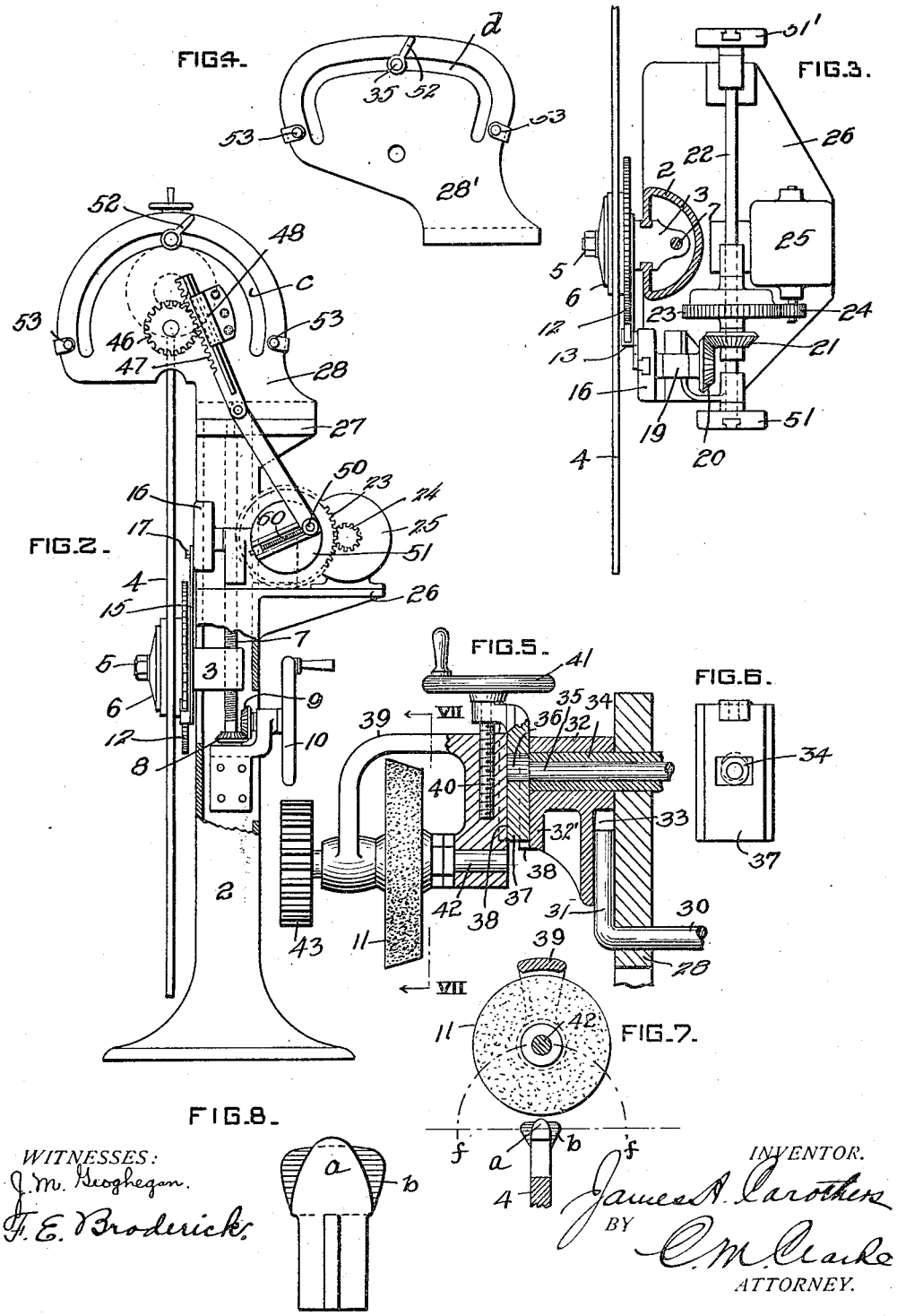

J. A. CAROTHERS.
SAW GRINDING MACHINE.
APPLICATION FILED SEPT. 6, 1917.

1,281,512.

Patented Oct. 15, 1918.
3 SHEETS—SHEET 3.

UNITED STATES PATENT OFFICE.

JAMES A. CAROTHERS, OF PITTSBURGH, PENNSYLVANIA, ASSIGNOR TO PITTSBURGH SAW & MANUFACTURING COMPANY, OF PITTSBURGH, PENNSYLVANIA, A CORPORATION OF PENNSYLVANIA.

SAW-GRINDING MACHINE.

1,281,512.        Specification of Letters Patent.      Patented Oct. 15, 1918.

Application filed September 6, 1917. Serial No. 189,961.

*To all whom it may concern:*

Be it known that I, JAMES A. CAROTHERS, citizen of the United States, residing at Pittsburgh, in the county of Allegheny and State of Pennsylvania, have invented certain new and useful Improvements in Saw-Grinding Machines, of which the following is a specification.

My invention relates to improvements in mechanism for grinding the teeth of circular saws, more particularly saws having inserted teeth. Ordinarily, the teeth of such saws are removed for grinding and because of the irregularity in grinding and inaccuracy in replacement, together with the usual wear, the teeth are very apt to, and as a rule do, assume unsymmetrical arrangements as to the desirable true circular mounting.

That is to say, with a set of teeth, which usually comprise alternating units of different form whereby to most economically and effectively act upon the object being sawed by means of a central acting tooth and an alternating laterally acting tooth, the correct arrangement of the teeth requires that they conform as to their apices and lateral edges respectively, to true circular or annular correspondence.

Where some of the teeth, as is frequently the case with separate individual grinding done when removed from the saw body, extend beyond other teeth, they are subject to the main portion of the work, any teeth which recede from such true annular position failing to come into proper cutting engagement with the work.

My invention has in view to overcome these difficulties and objections by providing mechanism for truly and accurately grinding the cutting face of each tooth, teeth of the same kind usually constituting two separate sets alternating as to each unitary tooth in form, as more fully hereinafter described, and illustrated in the drawings.

The invention comprises a grinding wheel and a carrying framework therefor provided with means for actuating the grinding wheel; for causing its center to traverse an annular path corresponding to the contour of the tooth being acted upon, thereby bringing the cutting periphery of the wheel into proper grinding relation to the tooth surface; means for thrusting the carrying spindle or shaft of the wheel away from operative engagement with the tooth; means for actuating the several parts and to the several details and features of construction and operation, as shall be more fully hereinafter set forth.

Referring to the accompanying drawings,

Fig. 2 is a similar view in elevation at right angles to Fig. 1;

Fig. 3 is a horizontal sectional plan view indicated by the line III, III of Fig. 1;

Fig. 4 is a detail view in elevation of the cam plate to be substituted when the alternating set of different shaped teeth is to be ground;

Fig. 5 is a detail sectional view showing the mounting and adjusting mechanism for the cutting wheel and its carrying head;

Fig. 6 is a face view of the slide bar for the cutting wheel head;

Fig. 7 is a similar sectional detail view indicated by the line VII, VII of Fig. 5, showing the cutting wheel with relation to the tooth being acted upon but thrust outwardly into inoperative or clearance position, as indicated in Fig. 5;

Fig. 8 is an enlarged detail view showing the relative arrangement of the teeth as to their cutting faces;

Figure 1:
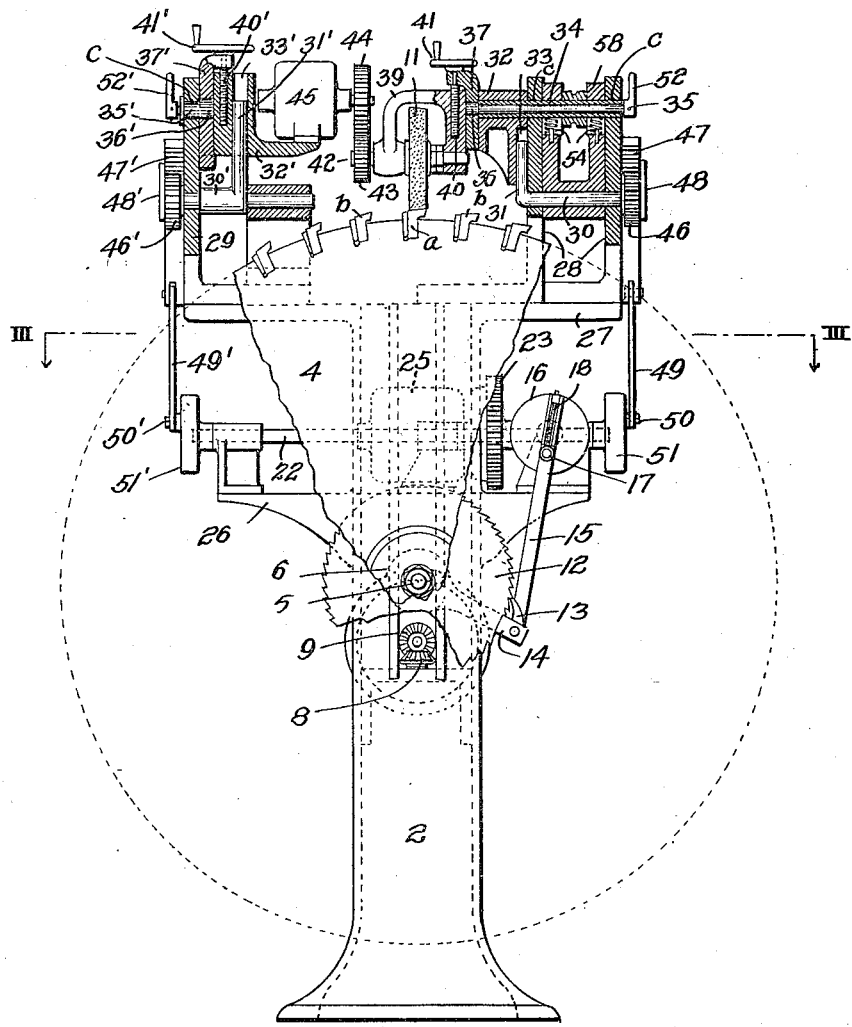
Figure 1 is a view in elevation, partly broken away and partly in section, of one form of machine embodying the invention and provided with a double head mounting for the cutting wheel and the driving motor respectively.

Referring to the drawings, 2 indicates a supporting base or frame in the hollow central portion of which is mounted a head 3 carrying the central body portion 4 of the saw.

The saw body is mounted for intermittent rotation upon a central stud or bolt 5 together with the usual clamping washers 6. Head 3 is engaged by threaded adjusting screw 7 suitably mounted in supporting bearings within the base 2, and is provided with a bevel wheel 8 engaged by an actuating bevel wheel 9 of the shaft of hand wheel 10, by which the screw 7 is rotated to correctly adjust the saw body and its teeth vertically, as will be readily understood, a sufficient range of adjustment being provided to accommodate saws of various diameters.

Saws adapted for grinding in a machine like that of my present invention are provided with inserted teeth $a$ and $b$ respectively. Teeth $a$ are of a form like that shown in Figs. 7 and 8 having a central rounded projecting cutting portion extending slightly beyond the face of the alternating teeth $b$, which, as shown, are wider than teeth $a$ and effect the cutting of the side portions of the main groove, in connection with the central cutting teeth.

For this reason, in a machine of the present character, it becomes necessary to treat the teeth of each set separately and for that reason it is designed that mechanism be provided for imparting partial rotation to the saw sufficient to move it annularly at each operation a distance corresponding to the space between two teeth, so as to bring all the teeth $a$ into a continuous series without treatment of the intervening teeth $b$, and likewise all of teeth $b$ successively into position without regard to the intervening teeth $a$.

In the construction of Fig. 1 I have shown the grinding wheel 11, which is ordinarily an emery wheel having its face suitably sloped to conform to the sloping face of the saw teeth, mounted in connection with an actuating motor which in turn is arranged for corresponding adjustment with the grinding wheel by its own carrying head.

Intermittent rotation is imparted to the saw 4 by means of a ratchet wheel 12 and a pawl 13 mounted in the outer end of an arm 14, pivotally mounted on shaft or bolt 5, and actuated by a pitman 15. Pitman 15 is actuated by a crank disk 16, and is mounted for stroke adjustment thereon at 17 on adjusting screw 18 of well known construction.

By this means, the stroke of the pitman and the corresponding movement of ratchet wheel 12 and of saw body 4 is accurately adjusted to the proper amount of movement with regard to the spacing of the teeth. Crank disk 16 is mounted in a suitable bearing 19 by its shaft which is driven by a bevel wheel 20 and a co-acting bevel wheel 21 on shaft 22. Said shaft is driven by gearing 23, 24, reduced to any desired speed, from a driving motor 25 which with the several parts, bearings, etc. is mounted upon a laterally projecting platform 26 of the main frame 2.

Mounted upon the top 27 of the main frame, which is laterally extended in the form of a supporting table, are the brackets 28 and 29 respectively, as in the double side construction of Figs. 1 and 2. Bracket 28, as shown, is double sided, providing ample bearing for the crank rod 30 having the inner crank arm 31 which actuates the cutter-wheel-carrying head 32.

Said head is designed to be partially rotated around the center of shaft 30, and also around the center of the curved face of teeth $a$, as controlled by the guiding cam slot $c$ of bracket 28. It will be understood that two such cam slots are provided by independent sets of brackets, whereby to provide for manipulation of the cutter wheel with relation to the contour of teeth $a$ and teeth $b$ respectively.

In Fig. 4 is shown a detail view of a substitute bracket 28' having the cam slot $d$ for control of the cutter wheel when used in grinding teeth $b$.

Cutter wheel carrying head 32 is designed to be reciprocated annularly over the inner face of cam bracket 28 and its range of movement is substantially co-extensive with the length of cam slots $c$, as actuated by crank extension 31. Said crank slidably engages the head 32 by a socket 33 thereof, so that the bracket is thrust around in one direction or the other with sufficient relative movement between it and the crank whereby the head 32 is free to be controlled by cam slots $c$ independent of the crank 31 or center of shaft 30.

Extending through the slots $c$ of standards 28 is a bushing 34 within which is rotatably mounted a stem 35 carrying on its inner end an eccentrically disposed actuating stud 36, which in turn engages a relatively reciprocable slide bar 37. Said slide bar is mounted between guiding edges 38 on the face of head 32 so as to maintain the slide bar in proper relation at all times to head 32, whereby to in turn hold the carrying bracket 39 of the grinding wheel 11 in proper relation to the face of the tooth being ground. Wheel bracket 39 in turn is also adjustably mounted upon the face of slide bar 37 by means of an adjusting screw 40 having a hand wheel 41, by which the bracket and wheel may be accurately set or adjusted, as will be readily understood. A double sided swinging crank 58 is secured to shaft 30, between brackets 28, adapted to swing in one direction or another in conformity with the movement of head 32 as actuated by crank 31. Bushing 34 is carried in the outer portion of crank 58, and is thus maintained always in operative relation with the co-acting head 32 during swinging movement.

The shaft 42 of grinding wheel 11 is mounted as shown in bearings at each side in bracket 39, and is provided with a driven pinion 43 which in turn is actuated by gear 44 of motor 45. Said motor in turn is mounted upon a supporting bracket 32′, which like wheel bracket 39 is adjusted by a screw 40′ and hand wheel 41′ of the slide bar 37′, which in turn is adjusted away from or toward the teeth by eccentric extension 36′ of shaft 35′. Bracket 32′ is also engaged in its socket 33′ by crank extension 31′ of shaft 30′. Said shaft, and the several other parts above described, are similar in construction and operation to those described and illustrated in connection with actuation and adjustment of the grinding wheel 11.

In the double side construction of Fig. 1, it will be understood that, the motor being mounted on its separate carrying bracket, it becomes necessary to impart to the motor the same relative travel as is imparted to the cutter wheel itself whereby to maintain the intermeshing driving engagement between gears 43 and 44 at all times. The parts are, therefore, mounted and adjusted together and operate and are actuated together.

They receive their initial movement from the arc-like travel of cranks 31 and 31′ operating simultaneously, for which purpose crank shafts 30 and 30′ are provided at their outer ends with pinions 46 and 46′ respectively. Each of said pinions is actuated by a rack bar 47 and 47′ respectively which are mounted in suitable bearings 48 and 48′ respectively on the outer faces of brackets 28 and 29 respectively. Rack bars 47 and 47′ are connected by pitmen 49 and 49′ respectively with the crank pins 50 and 50′ respectively of crank disks 51 and 51′. Said crank pins are, like the pivotal mounting 17 of pitman 15, adjustable with relation to the center of the crank disk by means of threaded stems or screws 60. Crank disks 51 and 51′, as shown in Fig. 3, are mounted on the ends of shaft 22 above described, and are actuated thereby simultaneously with the operation of crank disk 16 for the ratchet wheel mechanism, the several disks being suitably set whereby to effect the shifting of the saw body during the inoperative position of the grinding wheel, and to correspondingly actuate the grinding wheel during the stationary position of the saw during the reverse movement of the pawl actuating pitman 15.

By means of their connections with crank disks 51 and 51′, rack bars 47 and 47′ actuate pinions 46 and 46′ alternately in one direction and the other, correspondingly throwing the grinding-wheel-carrying and motor-carrying heads around over the inner faces of the cam-slotted frames as controlled by the slots therein, it being understood that bracket 29 is provided with a cam slot corresponding to slot c of bracket 28 through which travels the stud 35′.

For the purpose of actuating the terminal eccentrics 36 and 36′ of shafts or studs 35 and 35′ respectively, each is provided at its outer end with a dog 52 and 52′ respectively.

At suitable positions near the ends of the cam slot c and adjustably clamped to brackets 28 and 29 respectively are limiting stops or abutments 53, 53, extending as by studs or pins outwardly from the face of the bracket and into the path of movement of the arm of said dogs. By this means, as shafts 35 are thrust around in one direction and another, dog 52 will engage the stud at the end of its movement, thereby imparting rotation to the shaft and actuating the eccentric, whereby to thrust the slide bar 37 and 37′ outwardly or inwardly, these motions continuing alternately during the operation of the machine. By this means, the grinding wheel is maintained in its desired operative position with relation to, for instance, the face of tooth a being operated upon, but in its reverse movement preparatory to the next similar operation on the next succeeding tooth a, it will be thrust out of range of the alternating tooth b, which during reverse inoperative travel of the cutter wheel 11, is being shifted by the ratchet mechanism in order to bring the next tooth a into operative position.

At the termination of such saw shifting movement, the grinding wheel will have resumed its original position and will be lowered again into the operative path of movement prior to its reverse arc-like travel or operation on the next tooth a. Such movement of the grinding wheel is indicated by the arc f, f of Fig. 7. As stated, the motor 45 follows the same movements, maintaining its continuous driving engagement with the grinding wheel at all times.

Bushing 34, as shown in Fig. 1, is engaged by friction springs 54 whereby to exert a sufficient amount of outward pressure to press the bushing against the outer side of the cam slot so that any wear is always on such side.

Figure 9:
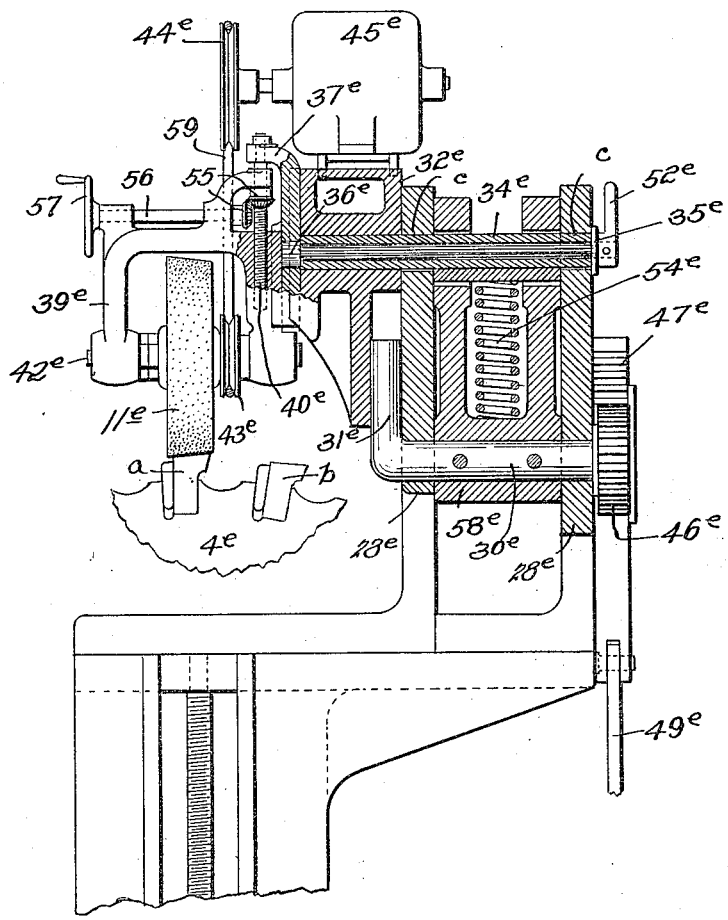
Fig. 9 is an enlarged sectional view similar to the right hand upper portion of Fig. 1, but showing the cutting wheel and motor as mounted upon a single carrying head, at one side only of the machine.

If desired, the grinding wheel and its driving motor may be both actuated on the same side of the machine, as in the construction shown in Fig. 9, so as to avoid the necessity of a double sided machine and a duplicate set of controlling cams, carrying heads, crank arms, etc.

Referring to said figure, the grinding wheel 11$^e$ is carried by its shaft 42$^e$ in a bracket 39$^e$ which is adjusted by screw 40$^e$ with relation to the slide bar 37$^e$. A pair of miter wheels 55 is utilized in such construction, together with a shaft 56 and hand wheel 57 for setting the grinding wheel bracket, as will be readily understood, and for convenience of operation. Driving motor 45$^e$ is mounted as shown on bracket 32$^e$ which in turn is engaged by crank arm extension 31ᵉ of shaft 30ᵉ, which in turn is actuated by pinion 46ᵉ and rack bar 47ᵉ connected by pitman 49ᵉ with the crank disk 51, as already described.

Bushing 34ᵉ is carried around through controlling slots c in the manner already stated, carrying with it shaft 35ᵉ and its dog 52ᵉ at one end and eccentric stud 36ᵉ at the other, engaging slide bar 37ᵉ and operating in the manner already described.

For the purpose of assisting the throw of the head 32ᵉ, the bushing 34ᵉ is positively engaged by a supplemental crank 58ᵉ, mounted between brackets 28ᵉ, like crank 58 of the construction of Fig. 1. A pressure spring 54ᵉ is also provided adapted to exert a resilient pressure against the bushing like springs 54 already described.

The construction and operation of the arrangement shown in Fig. 9 is substantially the same as that already described with relation to the teeth a and b of saw body 4ᵉ. The grinding wheel 11ᵉ is driven from motor 45ᵉ by means of a belt or cord 59 engaging grooved pulleys 44ᵉ and 43ᵉ respectively.

The advantages of the invention will be readily understood and appreciated by all those familiar with the operation of grinding the teeth of circular saws. The operation is substantially automatic after the saw is once mounted in position and the several parts are adjusted for their intended functions. Provision is made for accurate adjustment and compensation due to wear or any other contingency arising during the continuous operation of such machine, and aside from the accuracy and corresponding even and equally distributed cutting action of the saw itself when properly ground, the machine contributes largely to speed and economy of the entire grinding operation.

It will be understood that the invention may be variously changed or modified in construction or various details by the skilled mechanic, but all such changes are to be understood as within the scope of the following claims.

What I claim is:—

1. A grinding machine for saw teeth having a supporting bracket provided with a controlling cam slot, a rotatable grinding wheel, and a support therefor operatively mounted in said cam slot.

2. A grinding machine for saw teeth having a supporting bracket provided with a controlling cam slot, a rotatable grinding wheel, a support therefor operatively mounted in said cam slot, and means adapted to shift said support through the controlling range of said cam slot.

3. A grinding machine for saw teeth having a supporting bracket provided with a controlling cam slot, a rotatable grinding wheel, a support therefor operatively mounted in said cam slot, means adapted to shift said support through the controlling range of said cam slot, and means adapted to adjust the grinding wheel with relation to its support.

4. In combination, a grinding wheel, a carrying head therefor, a guiding cam, means for swinging the carrying head with relation to the cam, and means for independently adjusting the cutting wheel and its head.

5. In combination, a grinding wheel, a carrying head therefor a guiding cam, means for swinging the carrying head with relation to the cam, and means for independently adjusting the grinding wheel and its head with relation to the work at the termination of such swinging movement.

6. In combination, a grinding wheel, a carrying head therefor, a guiding cam, means for swinging the carrying head with relation to the cam, means for independently adjusting the grinding wheel and its head, and means for rotating the grinding wheel mounted to move in conformity with its swinging movement.

7. In combination, a main frame having a saw-supporting spindle, means for intermittently actuating said spindle, a guiding cam bracket, a grinding wheel and its head, a driving motor for the grinding wheel geared therewith, and actuating mechanism controlled by the cam bracket for swinging the grinding wheel and its head and motor.

8. In combination, a main frame having a saw-supporting spindle, means for intermittently actuating said spindle, a cam bracket, a grinding wheel and its head, a driving motor for the grinding wheel geared therewith, actuating mechanism controlled by the cam bracket for swinging the grinding wheel and its head and motor, and automatic means for independently adjusting the grinding wheel and its head with relation to the work at the termination of such swinging movement.

9. In combination, a main frame having a saw-supporting spindle, means for intermittently actuating said spindle, a cam bracket, a swinging head mounted on the cam bracket provided with a slide bar carrying a grinding wheel bracket, a grinding wheel in such bracket, a motor geared with the grinding wheel, a spindle movably mounted in the cam bracket and having an eccentric stud engaging the slide bar, and an actuating arm, abutments on the cam plate for said arm, a crank slidably engaging the swinging head and having a gear, a rack bar engaging said gear, and a motor geared with said rack bar and with the means for intermittently actuating the saw spindle.

10. In combination, a main frame having a saw-supporting spindle, means for intermittently actuating said spindle, a cam bracket, a swinging head mounted on the cam bracket provided with a slide bar carrying a grinding wheel bracket, a grinding wheel in such bracket, means for adjusting the bracket with relation to the slide bar, a motor geared with the grinding wheel, a spindle movably mounted in the cam bracket and having an eccentric stud engaging the slide bar, and an actuating arm, abutments on the cam plate for said arm, a crank slidably engaging the swinging head and having a gear, a rack bar engaging said gear, and a motor geared with said rack bar and with the means for intermittently actuating the saw spindle.

11. In combination with an intermittently rotated saw having inserted teeth, a movable grinding wheel adapted to engage the face of a tooth when stationary and to be retracted therefrom when the tooth is moved, a bracket for said wheel, a slide bar having a screw connection with said bracket, a reciprocable carrying head for the slide bar, a bracket provided with a guiding cam slot, a bushing extending therethrough and through the carrying head, a spindle within the bushing having at one end an eccentric engaging the slide bar and at the other end a dog, an arresting abutment therefor adjustably mounted adjacent each end of the cam slot, a crank rod extending through the supporting frame and having a terminal slidably engaging the carrying head, actuating means therefor, and a motor geared with the grinding wheel.

12. In combination with an intermittently rotated saw having inserted teeth, a rotatable grinding wheel adapted to engage the face of a tooth when stationary, and to be retracted therefrom when the tooth is moved, a bracket for said wheel, a slide bar having a screw connection with said bracket, a reciprocable carrying head for the slide bar, a bracket provided with a guiding cam slot, a bushing extending therethrough and through the carrying head, a spindle within the bushing at one end and an eccentric engaging the slide bar and at the other end a dog, an arresting abutment therefor adjustably mounted adjacent each end of the cam slot, a crank rod extending through the supporting frame and having at one end a crank terminal slidably engaging the carrying head and at the other a gear wheel, a rack bar engaging said gear wheel, and a motor geared with the grinding wheel.

13. In combination, a grinding wheel having its cutting face adapted to conform with the shape of the article to be ground, a carrying head therefor, and a supporting bracket provided with a controlling cam slot, said carrying head being adapted to reciprocate over the face of said bracket coextensive with the length of said cam slot.

In testimony whereof I hereunto affix my signature.

JAMES A. CAROTHERS.

Copies of this patent may be obtained for five cents each, by addressing the "Commissioner of Patents, Washington, D. C."